(12) United States Patent
Stratford et al.

(10) Patent No.: US 6,785,558 B1
(45) Date of Patent: Aug. 31, 2004

(54) SYSTEM AND METHOD FOR DISTRIBUTING WIRELESS COMMUNICATION SIGNALS OVER METROPOLITAN TELECOMMUNICATION NETWORKS

(75) Inventors: Scott B. Stratford, Santa Clara, CA (US); Simon P. S. Yeung, Cupertino, CA (US); Lance K. Uyehara, San Jose, CA (US); Robin Y. K. Young, San Jose, CA (US)

(73) Assignee: LGC Wireless, Inc., San Jose, CA (US)

( * ) Notice: Subject to any disclaimer, the term of this patent is extended or adjusted under 35 U.S.C. 154(b) by 5 days.

(21) Appl. No.: 10/313,900

(22) Filed: Dec. 6, 2002

(51) Int. Cl.[7] ............................................. H04Q 7/20
(52) U.S. Cl. .................... 455/561; 455/562.1; 455/560; 455/522; 455/69
(58) Field of Search ................................ 455/561, 560, 455/562.1, 522, 69; 370/328, 329, 338

(56) References Cited

U.S. PATENT DOCUMENTS

| | | | |
|---|---|---|---|
| 5,627,879 A | 5/1997 | Russell et al. ................. | 379/59 |
| 5,852,651 A | 12/1998 | Fischer et al. ............. | 379/56.2 |
| 6,023,625 A | 2/2000 | Myers, Jr. ................... | 455/503 |
| 6,112,086 A | 8/2000 | Wala .......................... | 455/434 |
| 6,374,124 B1 * | 4/2002 | Slabinski .................. | 455/562.1 |
| 6,522,641 B1 * | 2/2003 | Siu et al. ..................... | 370/338 |
| 6,674,966 B1 * | 1/2004 | Koonen ....................... | 398/70 |
| 2002/0055371 A1 * | 5/2002 | Arnon et al. ................ | 455/562 |
| 2002/0187809 A1 * | 12/2002 | Mani et al. ................. | 455/561 |
| 2003/0040337 A1 * | 2/2003 | Ylitalo ........................ | 455/562 |
| 2003/0114103 A1 * | 6/2003 | Dinkel et al. ................. | 455/17 |
| 2003/0162539 A1 * | 8/2003 | Fiut et al. .................... | 455/424 |

* cited by examiner

*Primary Examiner*—Edward F. Urban
*Assistant Examiner*—Huy Phan
(74) *Attorney, Agent, or Firm*—Lumen Intellectual Property Services, Inc

(57) ABSTRACT

A method for transporting wireless communication signals between a base station hotel and remote cell sites with separately digitized RF carrier signals is provided. Separately digitized carriers are transmitted over a digital network between the hotel and the remote sites, remaining in digital format until reaching terminal antenna units. At the antenna units, downlink digital signals are converted to analog RF signals and transmitted, while uplink analog signals are received and converted to digital signals. A corresponding system comprising a base station hotel, at least one remote site, and a digital data network connecting the hotel to the remote site is provided. The hotel includes a plurality of base stations and a digital hub for interfacing the hotel to the network. The remote site includes a set of antenna units connected via a local data link to a network access node for interfacing to the network.

19 Claims, 11 Drawing Sheets

SYSTEM AND METHOD FOR DISTRIBUTING WIRELESS COMMUNICATION SIGNALS OVER METROPOLITAN TELECOMMUNICATION NETWORKS

FIELD OF THE INVENTION

The present invention relates generally to wireless communication systems. More specifically, it relates to techniques for transporting signals from a base station hotel to remote transmitters using optical fibers.

BACKGROUND OF THE INVENTION

Wireless communication systems, and cellular system in particular, are evolving to better suit the needs of increased capacity and performance demands. Currently cellular infrastructures around the world are upgrading their infrastructure to support the third generation (3G) wireless frequency spectrum. Unfortunately, the tremendous capital resources required to upgrade the entire cellular system infrastructure inhibits the deployment of these 3G systems. It is estimated that up to 3 million 3G cell sites will be needed around the world by 2010.

Traditionally, a cellular communications system includes multiple remote sites, each providing wireless service to a geographic service area, or cell. As shown in FIG. 1, a cellular base station (BTS) is normally located in each remote site 100, together with an antenna tower, antennas, an equipment room, and a number of other relevant components. This traditional approach of deploying all the cell site equipment locally at each remote site has several drawbacks that contribute to the expense of the infrastructure, and upgrades to the infrastructure. At each remote site, a BTS room or cabinet to host the large base station equipment is required, as well as additional electric power supplies for the base station. This increases both the costs of the equipment at each site, as well as the costs of acquiring and renting the physical location for the equipment. The remote cell site equipment must be designed for future coverage and capacity growth, and upgrades to the equipment require physical access to the remote site.

To mitigate these problems, some cellular systems have been designed with a different architecture, as shown in FIG. 2. The base stations 240 for multiple remote sites 200 are centralized in a base station hotel 210, while the antenna towers and antennas remain located at various remote sites at a distance from the base station hotel. Separating the base stations 240 from the antennas, however, makes it necessary to transport RF signals between the base station hotel and the various cell sites that it serves, typically using signal converters 250, network interface equipment 260, and a broadband communication network 220. When broadband fiber optic cables are used, RF signals from the base stations are converted to optical format and communicated over the fiber optic cable and then converted back to analog RF signals at the remote sites. After the optical/RF conversion, the signal is sent to one of several sector transmitters 230 and radiated over the air via the antenna to provide cellular coverage. The BTS hotel concept is especially valuable in metropolitan areas where fiber is abundant but equipment space comes at a premium. In these types of areas it is getting increasingly more difficult to deploy new cell sites due to a variety of factors including regulatory and space constraint issues.

Unfortunately, a significant portion of the metropolitan fiber networks already are configured to carry particular types of traffic such as telephony and data. While there is capacity available for additional traffic it must be transmitted in a format that is compatible with the existing traffic. Simply applying the RF signals to the fiber in an analog fashion would require the use of expensive optical components to optically multiplex the analog signals on to the fiber using some type of wavelength division multiplexing. This assumes that the existing network even supports wavelength division multiplexing which is not always the case. In addition, non-standard access equipment would be required to combine the optical signal carrying the RF signals with the optical signals containing the existing digital traffic.

Several techniques have been proposed for the digital transport of cellular signals over existing switched data networks. The typical approach, such as that disclosed in U.S. Pat. No. 5,627,879 to Russell et al., is to digitize a broadband RF signal comprising several dozen RF carriers using a single A/D converter. The digitized broadband signal is then transmitted to the remote sites where a D/A converter is used to recover the broadband analog signal containing the multiple RF carriers. It should be emphasized that the A/D and D/A converters at each end of the communication link convert an entire broadband RF signal containing multiple RF carriers. U.S. Pat. No. 5,852,651 to Fischer et al. describes a similar technique. Broadband RF signals from different sectors may be combined with each other or may remain separated, but in either case A/D and D/A conversion is performed on the entire broadband signal associated with each antenna. It should also be emphasized that the conversion at the remote site always takes place at the remote site's centrally located interface to the switched network, so that the broadband signal is communicated in analog RF form between the central network interface and the various sector antenna transmitters and their associated antennas.

SUMMARY OF THE INVENTION

The present invention introduces an improved technique for transporting wireless communication signals between a set of base stations in a base station hotel and a set of remotely located cell sites. In contrast with prior techniques that digitize the entire broadband RF signal associated with each antenna, the present invention proposes a technique that separately digitizes each RF carrier signal within the broadband RF signal. Separately digitizing each RF carrier has significant advantages, such as easing the dynamic range requirements on both the receiver and A/D converter. The separately digitized carriers are transmitted over a digital network between the base station hotel and the remote sites. In contrast with prior techniques, however, the present invention provides a technique wherein the digitized carrier signals are not converted to analog format when they first arrive at the remote site, but remain in digital format as they are distributed within the remote site to the various antenna units of the remote site. In other words, the remote site A/D and D/A converters are terminally located at the antenna units rather than positioned at an intermediate point in the signal transport path, such as the remote site's interface with the digital network.

Because signals are transported in a purely digital form until the very end of the digital transport (i.e., all the way up to the antenna units), the method of the invention enjoys some key benefits over prior systems that use analog transport at the remote site to distribute the RF signals to separate antenna units. Optical effects that limit analog systems such as attenuation, dispersion and reflection do not directly affect the cellular signal when digital transport is used. As a result, the system can send signals over much longer distances without degradation. Also, dynamic range is unaffected by distance since the digital samples suffer no degradation due to the transport process as long as reliable communications exist. Signal reconstruction techniques can also be used with digital data to ensure data integrity through the entire transport process. For example, error-coding algorithms can be used to detect and correct bit errors. These benefits apply to both downlink and uplink directions.

In one aspect of the invention, a method of downlink wireless communication is implemented by a system comprising a base station hotel, at least one remote site, and a digital data network (e.g., a fiber optic network) connecting the hotel to the remote site. The base station hotel houses a plurality of base stations and a digital hub which connects the base stations to the digital network. The remote site has a set of antenna units, where transmitters and antennas are located, and a network access node connecting the remote site to the digital network. A local data link (e.g., dedicated fiber optics, or conventional LAN) within the remote site connects the antenna units to the network access node.

In an aspect of the invention providing transport of downlink signals, each of the base stations generates a set of carrier signals, where each carrier signal comprises multiple information channels (e.g., multiple user signals code-modulated onto a carrier frequency of the carrier signal). In some systems, a base station will generate several carrier signals at various distinct carrier frequencies. In addition, a base station may also generate several carrier signals intended for transmission to distinct sectors of a remote site. Each carrier signal is then individually digitized by the digital hub to produce a digitized carrier signal. The digitized carrier signals are then formatted appropriately and communicated via a digital data network to various remote sites. Typically, there is a one-to-one correspondence between base stations and remote sites, so that a given carrier signal will be sent to a single corresponding remote site. In some cases, however, a base station can multicast to multiple remote sites, or various base stations can provide carrier signals to the same remote site. Once received at the appropriate remote site, the digital carrier signal is sent via a local digital link to an antenna unit where it is converted to an analog carrier signal. The analog carrier signal is then frequency up-converted, amplified, and transmitted from an antenna to subscribers assigned to the various information channels of the carrier signal. In systems that use sectorization, the set of carrier signals comprises carrier signals for each of the various sectors at a cell site.

In another aspect of the invention, an analogous method of uplink communication is provided in the same system. According to this method, analog carrier signals are received at antenna units and separately digitized there prior to being transported over a local digital link to a network access node at the remote site. The digital carrier signal is then sent over the digital data network to the base station hotel. Other carrier signals from the same antenna unit, from other antenna units at the same remote site, or from other remote sites are similarly sent to the base station hotel in digital format. The separate digital carrier signals are then converted to analog carrier signals and received by the appropriate base station in the hotel.

In a preferred embodiment of the invention, the cellular communication system is a 3rd generation cellular system where each of the multiple carriers within the broadband RF signal uses CDMA (code division multiple access) to multiplex several information channels onto the same RF carrier. In such systems, it is important to accurately maintain proper signal power levels. Accordingly, in order to compensate for any signal power level distortions introduced during conversion and processing, the preferred embodiment uses a power control channel to transport power measurement signals between the base station hotel and the remote sites. After the RF carrier signals have been digitally transported, the power measurement signals are then used to appropriately scale the signal power level of each RF carrier to compensate for any distortions.

In systems that employ CDMA (code-division multiple access), a time-diversity technique of the present invention may be used as well. In the downlink, after a carrier signal is transported to an antenna unit, both the original signal and a time-delayed copy of the signal are transmitted via separate antennas. This technique provides an additional diversity signal to the subscribers without requiring any additional bandwidth between the base station hotel and the antenna units. In the uplink, primary and diversity signals received at the remote site can be superimposed with a relative time delay and then transported as one digital signal. At the base station, the two superimposed signals are automatically separated by the base station's RAKE receiver.

In another aspect of the invention, the method is implemented in a cellular system using a digital hub at the base station hotel for performing the required A/D and D/A conversions, signal processing, and interfacing with the switched data network. A similar network access node is used at each remote site. In the downlink direction (from the base station to mobile user) the digital hub digitizes the RF signals emanating from the base station and formats the digitized samples into a standard telecommunication protocol such as OC-X (OC-3, OC-12, OC-48, OC-192, etc.), STM-n (STM-1, STM-4, STM-16, etc.) or Gigabit Ethernet. The appropriate format is determined by the specific type of transport network deployed. Using this standard data format, the digital hub uses network access equipment such as an add/drop multiplexer to interface to the digital network. The digital network is then used to transport the digitized RF signals to the remote cell site. At the remote cell site a remote version of the digital hub, the network access node (NAN), is then used to recover the digital RF carrier signals from the network. After being distributed to the appropriate antenna radio units, the digital signals are converted to analog RF signals and broadcast over the air to the mobile users using an amplifier and suitable antennas.

In the uplink direction, similar reciprocal functions exist. At the remote site the antenna units receive analog RF signals over the air through a receiving system that typically consist of an antenna, amplifiers and filters. The received analog signal is then down-converted, digitized and sent over a local data link to the remote site's NAN where the digital carrier signal is formatted into a standard telecommunication protocol, multiplexed onto the digital network, and sent over the digital network to the base station hotel. At the base station hotel, the digital hub is used to extract the data from the telecom network, and convert the digitized RF carrier signals from the network data format back into their native analog RF format. Finally, the RF analog signals are provided to the appropriate base stations for processing. In most instances, the same telecommunication protocol will be used in both the downlink and uplink directions. There may be situations, however, (especially with asymmetric services and applications) where different protocols can be used in each direction.

The techniques of the invention are independent of the specific wireless protocol (W-CDMA, CDMA-2000, GSM, IEEE802.11x, Bluetooth, etc.) and the protocol used over the telecommunications network. Preferably, the technique also provides signaling between the digital hub and the NAN such that control, operational, administrative and maintenance information may be exchanged between the base station hotel and the remote site. This signaling can also be used to transport other services such as data for the support and application of location-based services.

DETAILED DESCRIPTION

Figure 1:
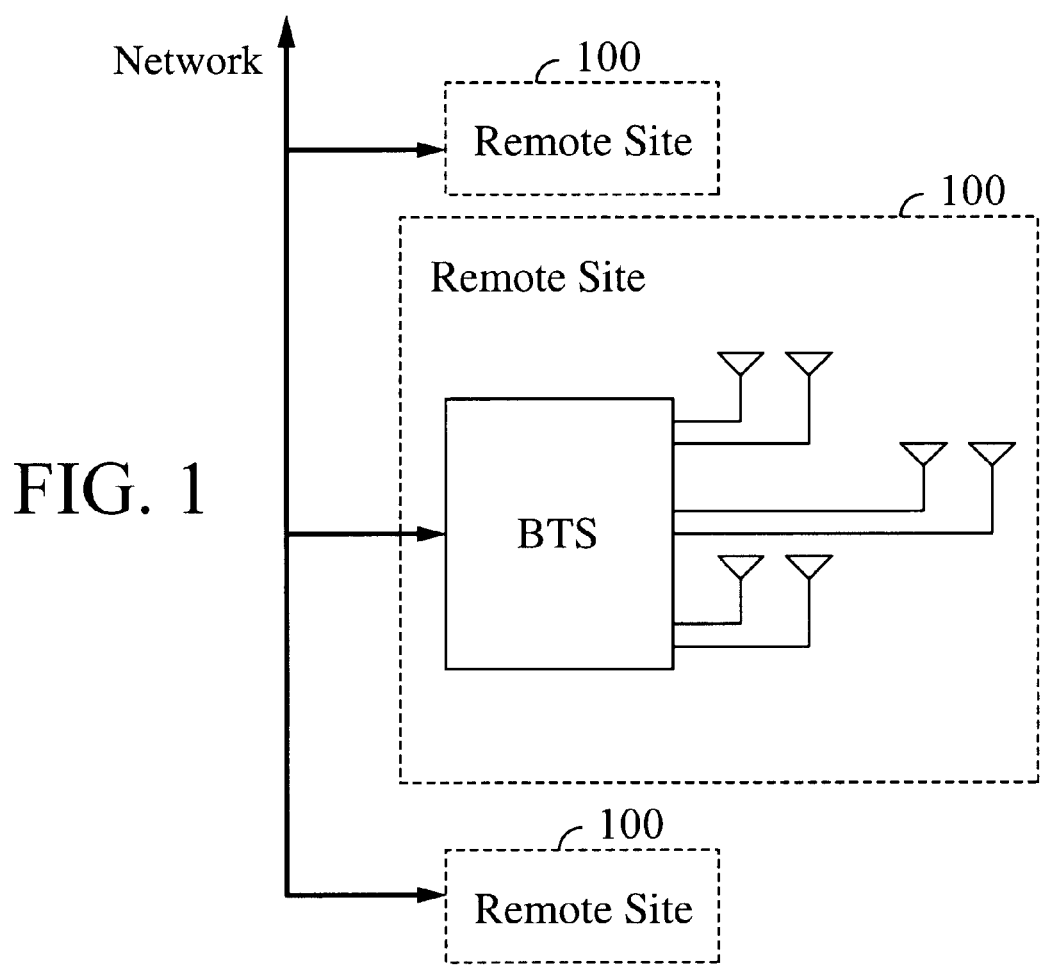
FIG. 1 is a block diagram illustrating a first communication system network architecture according to the prior art.
Figure 2:
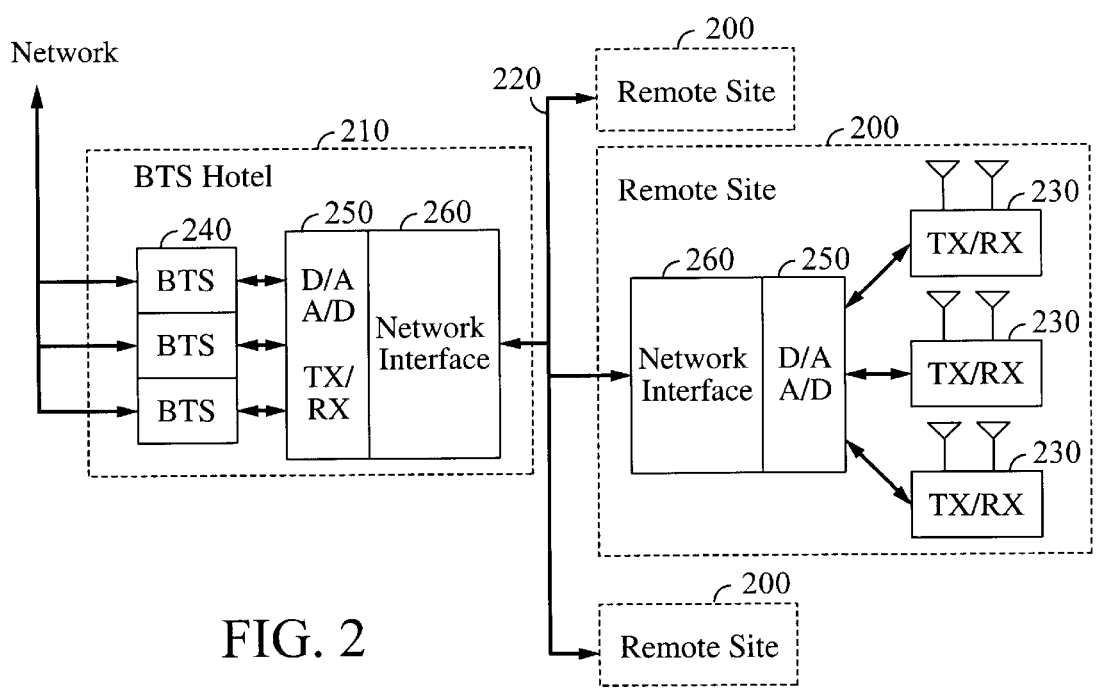
FIG. 2 is a block diagram illustrating a second communication system network architecture according to the prior art.

Preferred embodiments of the invention will now be described in detail with reference to the drawing figures. Those skilled in the art will appreciate that the following description of the preferred embodiments contains many specifics for the purpose of illustration only, and that the principles of the invention are not necessarily limited by these details.

In the present description, the term "carrier signal" is used to mean a spectrum bandwidth that is modulated by some standard modulation technique to carry an information signal. For example, one type of carrier signal is a narrow band frequency carrier containing one AMPS subscriber channel or a few TDMA subscriber channels. Another type of carrier signal is a wideband CDMA signal containing many code-modulated subscriber channels. The term "channel" is used in the broad sense as including not only frequency channels as in FDMA, but also code channels such as a CDMA channel, time/frequency channels such as in TDMA, and generally any type of information channel derived by dividing the wireless spectrum using a multiplexing technique involving frequency, time, code, space, etc. In this general use of the term, each channel typically corresponds one-to-one with a subscriber information signal that is allocated to the channel.

Figure 3:
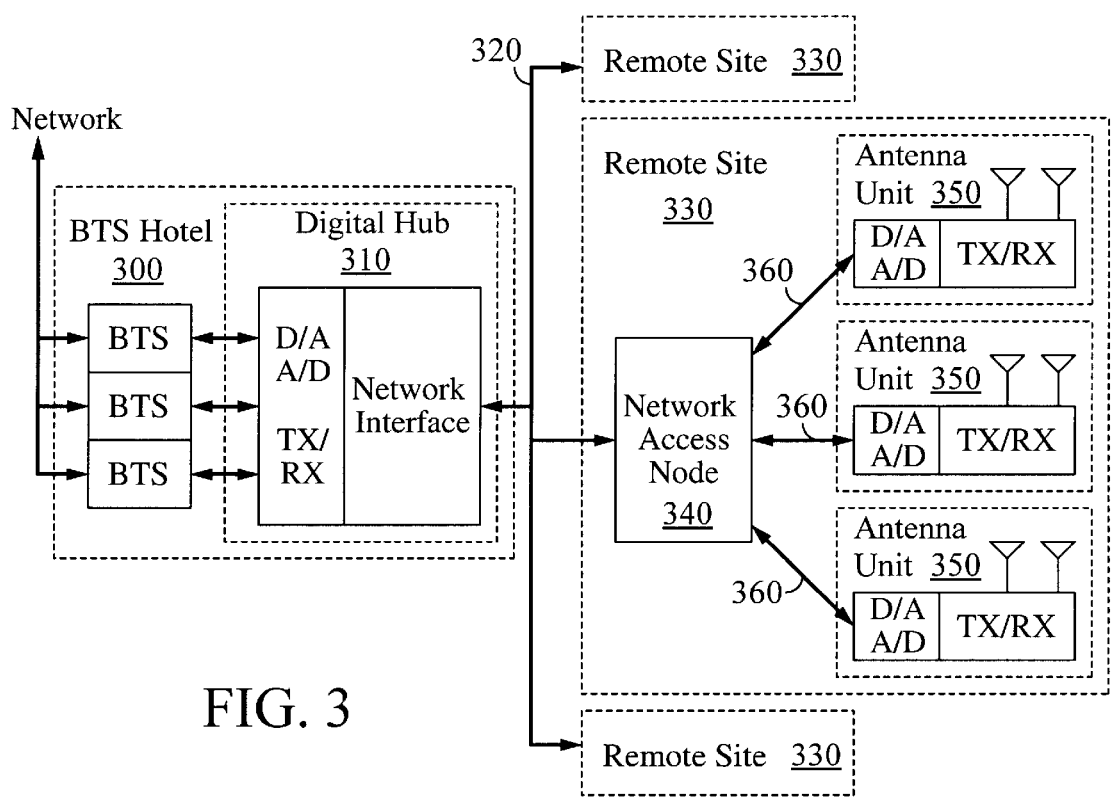
FIG. 3 is a block diagram illustrating a communication system network architecture according to a preferred embodiment of the present invention.

A block diagram of a wireless communication system implementing the techniques of a preferred embodiment of the present invention is shown in FIG. 3. A series of base stations (BTS) reside in a BTS hotel 300. The base stations are connected to a digital hub 310 that also resides in the BTS hotel. The digital hub 310 is connected via a digital network 320 to one or more remote sites 330. Each remote site has a network access node (NAN) 340 and several remote antenna units 350 connected to the NAN 340 by digital communication links 360. Downlink cellular signals from a base station are digitized at the digital hub 310 and sent as standard formatted data over the digital network 320 to the NANs 340. The NANs remove the network formatting and send the digital signals to the antenna units 350 where they are converted back to RF analog signals which are then transmitted to wireless subscribers. In the uplink direction, the antenna units 350 receive RF transmissions from the subscribers. These analog RF signals get digitized then sent to the NAN 340 where they are formatted and sent over the optical fiber to the digital hub 310. The digital hub converts the uplink data back to analog RF signals which then get passed on to the appropriate base stations (BTS).

RF/Digital Conversion

Figure 4:
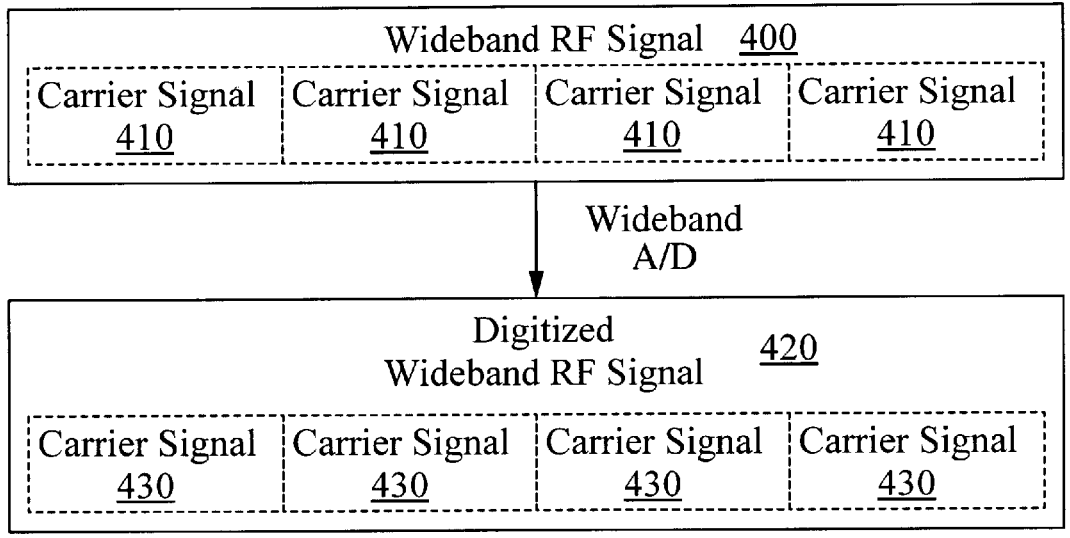
FIG. 4 is a diagram illustrating the technique of wideband digitizing according to the prior art.
Figure 5:
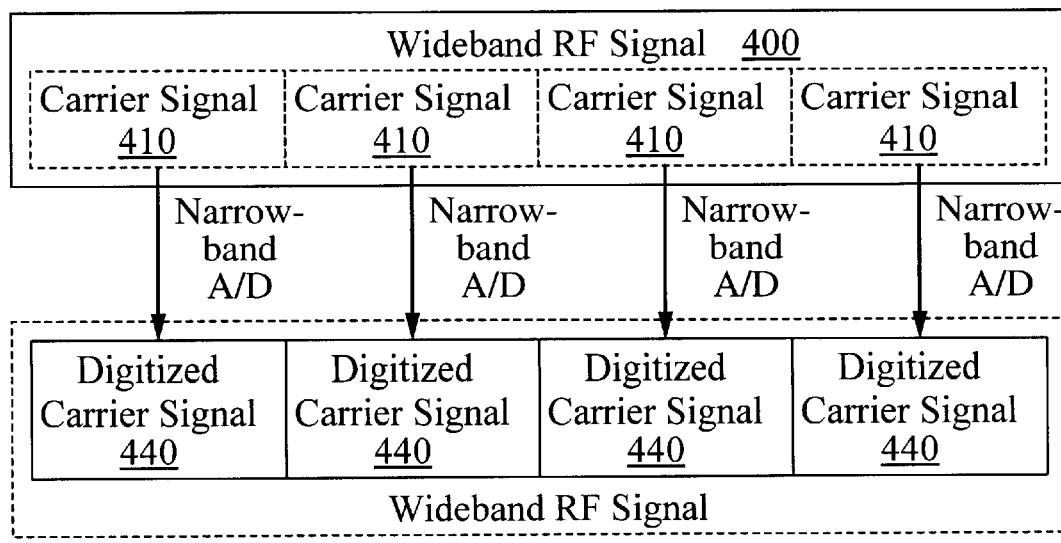
FIG. 5 is a diagram illustrating the technique of narrowband digitizing according to a preferred embodiment of the present invention.

The technique of the invention employs narrowband digitizing rather than wideband digitizing when digitizing cellular RF signals. In other words, each cellular carrier signal is separately converted from analog to digital format (and vice versa). Wideband digitizing and narrowband digitizing are illustrated in FIGS. 4 and 5, respectively. As illustrated in these figures, an RF wideband signal 400 may contain several distinct narrowband carriers 410 (e.g., CDMA carriers, each having multiple code-multiplexed channels). FIG. 4 illustrates the method employed by the prior art, where a wideband A/D converter is used to digitize the entire wideband RF spectrum 400 to obtain a single digitized wideband signal 420 containing digitized narrowband carriers 430. In contrast, FIG. 5 illustrates the method used in a preferred embodiment of the present invention, where narrowband A/D converters are used to digitize separately the distinct narrowband carriers 410 to obtain digitized narrowband carriers 440. Both performance benefits and flexibility stem from this separate conversion of carrier signals.

Prior digital transport systems that use wideband digitizing generally require wideband receivers to down-convert the RF signal to IF before the digitization process takes place. After the signal is digitized using an A/D converter, either (1) the entire digitized band must be sent to the appropriate remote site or (2) digital filters must be used to extract certain narrower bands which are then sent to the appropriate sites. When narrower bands are digitally extracted from the wideband data, the amount of data to be transported is reduced, and thus a lower bandwidth communication link is required, resulting in cost savings. However, these prior systems require expensive up/down-converters and A/D converters that can handle the strict dynamic range demands of the wideband signal. They also require complex digital filtering and have complications due to the different power levels of the various carriers. When a wideband signal containing multiple channels is digitized all at once, the A/D converter must handle the differences in power levels for all channels.

Digitizing channels individually solves these problems. Much cheaper down/up-converters can be used due to the less-stringent dynamic range requirements tied to the narrower bandwidth of a single carrier. Less dynamic range is also required of the A/D converter when digitizing a single carrier signal. In addition, the A/D converter only has to account for a single power level for the one carrier being converted. This advantage is particularly beneficial for TDD types of signals, such as W-CDMA, 802.11 and Bluetooth standards. The extra cost and latency of digital filters or digital down-converters can also be avoided when only a single carrier is digitized as opposed to multiple carriers. Also, the extra step of digitally extracting each individual carrier or group of carriers is avoided when only digitizing a single carrier.

Auxiliary Channels

In addition to the digitized cellular channel data that gets passed between the digital hub and the remote site, a number of auxiliary data channels may be transported as well. These channels support a number of important functions relating to basic cell-site operation as well as some optional features. The major auxiliary channels contain the following information:

Power control scaling bits

Remote site antenna positioning information

Time-of-arrival information for such features as location-based services (LBS)

Operational, administration and maintenance capabilities

Power Control Sub-Channel

The power control sub-channel is used to send power control information between the digital hub and the remote site. In the downlink, the transmit power level of each separately digitized RF carrier is sent to the remote site where it is extracted and used to set the transmit power levels. In the uplink, the received power level at the remote site is monitored and sent back to the digital hub where it is used to set the proper signal level being fed back to the base station. This type of real-time, high-resolution power control is particularly critical with CDMA types of signals, such as those used for $3^{rd}$ generation cellular systems. The fact that each carrier is converted between digital and analog formats individually (narrowband digitizing) aids in the accuracy of the power control since the power level of each carrier can be monitored and scaled independent of other carriers.

Downlink power control information can be obtained by the digital hub in two different ways. With the first method, the base station's transmit power level is received directly from the base station in a digital form. This digital information is fed into the power control sub-channel where it gets forwarded to the remote site. The second method of power control is used in cases where the base station does not output such transmit power information as a separate digital channel. For this case, the digital hub constantly monitors the base station's output power level for each carrier and then stores a digital representation of the power level in the power-control sub-channel. This technique allows the analog carrier signal to be arbitrarily scaled to a level that will maximize dynamic range during A/D conversion.

Antenna Positioning Sub-Channel

The antenna-positioning sub-channel is used to send remote site antenna adjustment information from the base stations to the appropriate remote site where the antenna position is adjusted accordingly. Typically, antenna control information is received from the base station as a digital signal. This signal is framed and fed into the appropriate sub-channel for transmission to the remote site. At the remote site, the data is extracted from the sub-channel and used to set the correct tilt for the appropriate antenna.

Time-of-Arrival Sub-Channel

The time-of-arrival (TOA) sub-channel is primarily used for sending timing information from the remote antenna sites back to the base station location. The remote site generates time-of-arrival information that records the exact time an uplink signal was received at the remote site antennas. This timing information is placed in the appropriate uplink auxiliary channel where it is transported back to the base station. The primary purpose of the TOA sub-channel is to provide time-of-arrival information for location based services.

OA&M Sub-Channel p Operation, maintenance and administration (OA&M) information makes up another sub-channel. This channel supports the monitoring and controlling of remote site equipment through the NAN as well as allowing the NAN status to be reported back to the digital hub. Additional auxiliary channel capacity allows for potential future requirements such as monitoring network performance.

System Architectures

The preferred embodiment is implemented in a system having a double-star architecture, as shown in FIG. 3. The digital hub 310 branches out to one or more NANs 340, e.g. using a digital fiber-optic network 320. At each remote site 330, the NAN 340 branches out to one or more sector antenna units 350, e.g. using composite fiber cable 360. This double-star architecture provides for a cost-effective and efficient system.

Since each remote site 330 has a single NAN 340 that provides the remote site's antenna units 350 with a common interface to the telecom network 320, all data sent between the digital hub 310 and the remote site 330 can be transmitted over a single link. This link could be provided by an existing switched digital network, or by a dedicated optical link. In the latter case, one fiber is used for downlink, another for uplink. For certain configurations where WDM is used, both uplink and downlink information can be transmitted over the same fiber. Multiple sectors as well as diversity channels may be multiplexed onto a single fiber if they are traveling to or from the same remote site. The fact that they are contained on the same fiber allows the use of a single demultiplexing unit to extract the signals from the telecom network. For example, each remote site in a SONET/SDH system requires only a single add/drop multiplexer (ADM) followed by a single SONET card, regardless of the number of sectors or carriers used.

In a preferred embodiment, the remote site 330 also centralizes the power supply using composite fiber optic cable 360. This design allows the power amplifiers and antennas to be located a considerable distance from the common power supply (on the order of 100 m), thus adding flexibility and cost-savings to remote site installations. Because the power amplifiers are located at the same place as the antennas, less RF signal loss is experienced between these two elements. Also, by keeping the data in digital format until the very end of its transmission path at the antenna units 350, the potential for signal degradation due to optical/analog effects is minimized. Likewise, the uplink signal is digitized immediately at the antenna units 350, before any type of optical transmission occurs.

Typically, the separation between the base station hotel 300 and the remote sites 330 is between 1 km and 10 km, although longer distances are feasible. In some embodiments, one of the remote sites is positioned at the base station hotel, or very close to it. At the remote site, the separation between the remote site NAN 340 and the antenna units 350 is typically between 1 m and 100 m.

Figure 6:
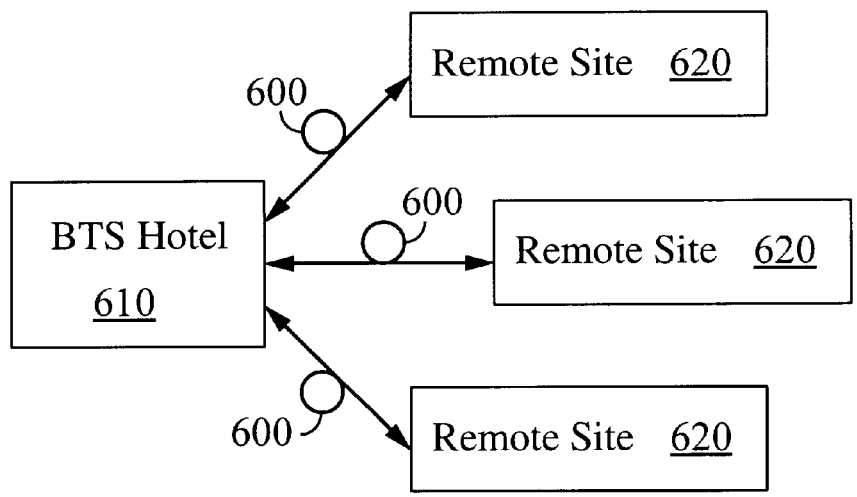
FIG. 6 is a block diagram illustrating a point-to-multipoint network architecture for a communication system according to a preferred embodiment of the invention.

Depending on the type of situation for which the system is employed, a number of variations of the double-star architecture can be realized. For implementations where dark or unused fiber is available, a point-to-point/point-to-multipoint configuration can be used to connect the digital hub to the NANs. With this type of architecture, the digital hub and NANs can be directly connected to each other through the fiber without the aid of additional network access equipment. FIG. 6 is an example of a point-to-multipoint architecture using dedicated fiber 600 connecting a BTS hotel 610 with multiple remote sites 620. If all but one of the remote sites 620 were removed, it would illustrate a point-to-point architecture.

When either lit fiber is used, or a ring or daisy-chain architecture is employed, network access equipment is required to interface with the optical network. For example, a SONET/SDH system would require add/drop multiplexers at both the digital hub and the NAN sites to multiplex the digital data onto the existing optical network.

Figure 7:
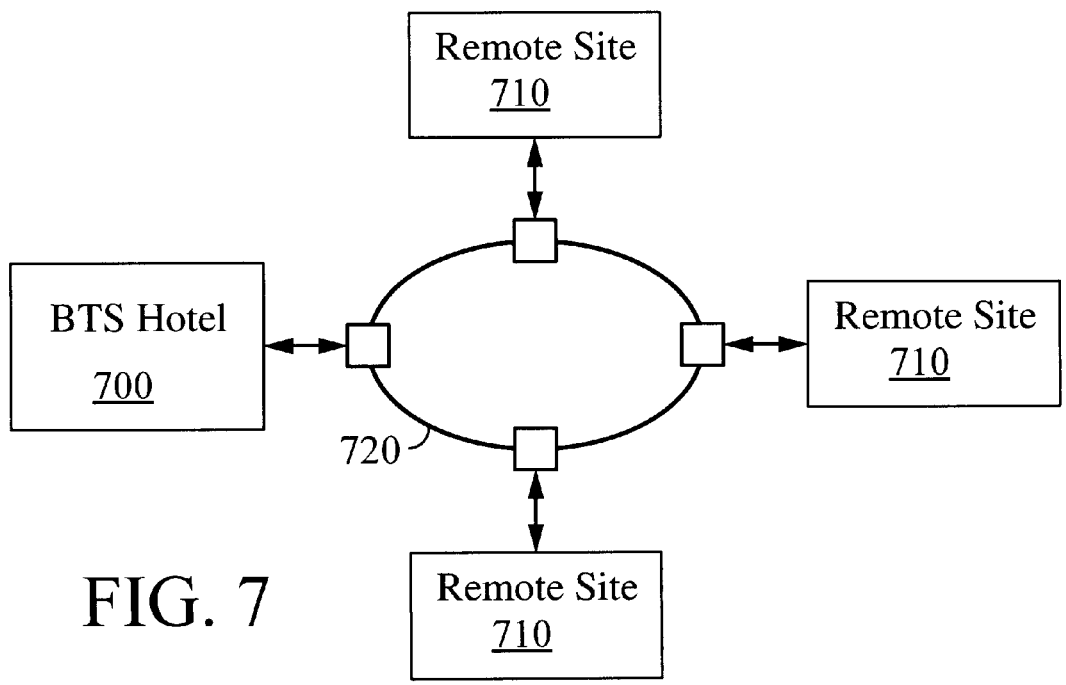
FIG. 7 is a block diagram illustrating a ring network architecture for a communication system according to a preferred embodiment of the invention.
Figure 8:
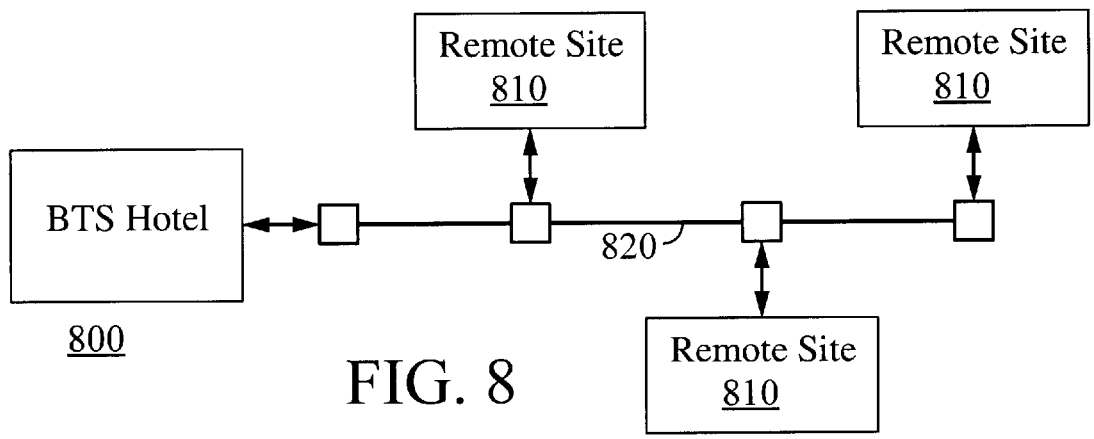
FIG. 8 is a block diagram illustrating a daisy chain architecture for a communication system according to a preferred embodiment of the invention.

Ring networks are commonly used in telecommunications networks because of their survivability. They can be set up such that if communication is lost at one point in the ring, the telecommunications equipment is able to maintain operation using a separate route. Examples of ring and daisy-chain architectures for SONET networks are shown in FIGS. 7 and 8, respectively. FIG. 7 shows a BTS hotel 700 connected to remote sites 710 via a ring network 720. FIG. 8 shows a BTS hotel 800 connected to remote sites 810 via a daisy-chain network 820.

Capacity

Wavelength-division multiplexing (such as DWDM and CWDM) can be used for increased fiber capacity when using various network configurations. When this is done, a WDM multiplexer/demultiplexer is used to interface the digital hub and NANs to the optical cable.

For the case of a SONET/SDH system supporting a UMTS cellular system, the following capacity issues apply. A single OC-3/STM-1 optical channel (155.52 Mbps) will support a single cellular sector containing one WCDMA carrier with transmit/receive diversity. For a tri-sector cell (also with one carrier and diversity), an OC-12/STM-4 link (622.08 Mbps) is required. An OC-48/STM-16 channel (2488.32 Mbps) will support four remote sites under the same circumstances.

As an example, a SONET OC-12c link operates at 622.08 Mbps and provides a 599.04 Mbps raw data rate (after extracting all the SONET overhead). This type of link is sufficient for transporting six carriers between a digital hub and a network access node. For this case, each individual carrier will have a 99.84 Mbps data rate. Table 1 lists the raw data rates for different OC levels and the corresponding number of UMTS carriers that could be supported for this example implementation. In reality, the actual data rate per carrier will be slightly lower due to additional overhead, such as auxiliary channel data.

TABLE 1

Example Data Rates for SONET Implementation.

| SONET OC Level | Raw Data Rate (Mbps) | Number of Carriers | Data Rate per Carrier (Mbps) |
|---|---|---|---|
| OC-12c | 599.040 | 6 | 99.840 |
| OC-48c | 2396.160 | 24 | 99.840 |
| OC-192c | 9584.640 | 96 | 99.840 |

Signal Reconstruction

The potential exists for an unreliable communication path between the digital hub and NAN due to the digital network. In order to ensure reliable data transport, a number of safeguards are implemented. Error correction coding can be used to add redundancy to data at both the digital hub and the NAN before the data is sent over the network. This redundancy allows for the detection and correction of bit errors that may occur during transmission. Both sites then use the redundancy bits in the data they receive to continuously monitor the integrity of the communication path. When errors do occur, error correction algorithms may be used in an attempt to rectify the bits in error.

Figure 9:
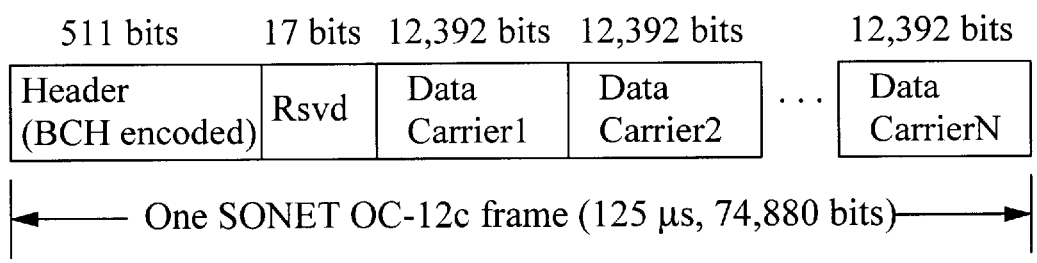
FIG. 9 is a diagram illustrating a digital data frame structure used in a preferred embodiment of the present invention.

As an example, a system could use a SONET OC-12c link to transmit six carriers between a digital hub and a remote site. The link could use the SONET frame format shown in FIG. 9. A practical implementation might be a three-sector site with two carriers on each sector. Each 125 µs SONET frame at this OC level contains 74,880 bits of actual payload. The payload could be divided among the six carriers.

In this example, the header contains sub-channel information such as power-control bits and OA&M messages. The actual digitized cellular signals are contained in fixed bit data positions after the header. In order to ensure the reliability of the header, a 511 bit BCH code is used for encoding. The code contains 63 parity bits and can correct up to 7 bit errors. The generator polynomial is:

$$g(X) = x^{63} + x^{58}$$
$$+ x^{57} + x^{55} + x^{51} + x^{49}$$
$$+ x^{46} + x^{43}$$
$$+ x^{42} + x^{40} + x^{39}$$
$$+ x^{38} + x^{37} + x^{36}$$
$$+ x^{33} + x^{32} + x^{31}$$
$$+ x^{28} + x^{25} + x^{24}$$
$$+ x^{23} + x^{22} + x^{21} + x^{19}$$
$$+ x^{16} + x^{13} + x^{10} + x^2 + 1.$$

Figure 10:
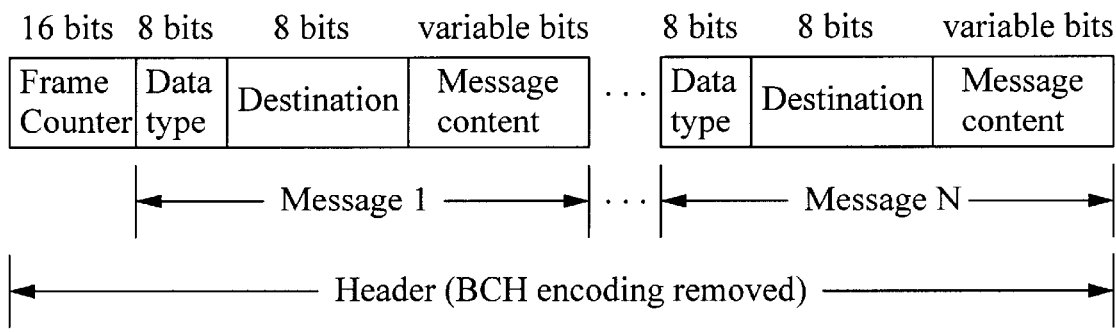
FIG. 10 is a diagram illustrating a digital data header structure used in a preferred embodiment of the present invention.

After the SONET frame is received, the header is decoded using standard BCH decoding techniques. During this process, any bit errors that did occur in the header will be corrected (up to seven errors). The header information is then extracted and processed. Each header message is arranged in a standard format according to the "internal protocol". For example, a "data type" field could identify the message type and a "destination" field could identify the carrier or antenna to which the message corresponds. The data portion of each header message would contain information specific to the message and its length would depend on the message type. FIG. 10 shows an example of how a header may be constructed for such an implementation.

Interleaving Across Channels

Figure 11:
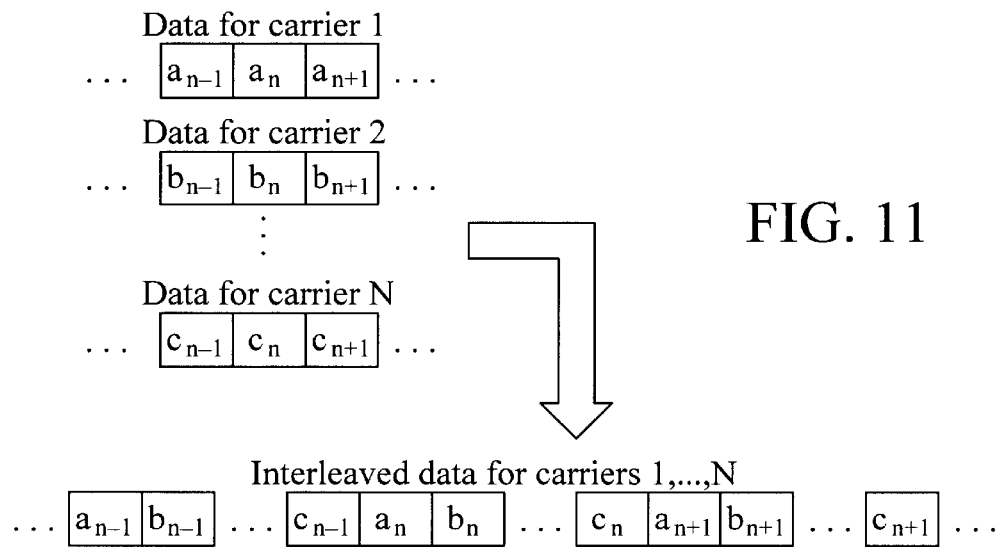
FIG. 11 is a diagram illustrating a data interleaving technique used in a preferred embodiment of the present invention.

Data interleaving is a technique that is used to randomize the location of bit errors, allowing the errors to be more easily corrected. For remote sites with more than one carrier or with transmit diversity, interleaving can be done across the different carriers. This technique allows the same basic benefit of interleaving in time, but does not require the same latencies that come with interleaving in time only. FIG. 11 illustrates the concept of interleaving across N carriers where each individual block represents a bit or group of bits. In this figure, N blocks of carrier data (represented by the data sequence $\{\ldots, a_{n-1}, a_n, a_{n+1}, \ldots\}$ for carrier 1, the data sequence $\{\ldots, b_{n-1}, b_n, b_{n+1}, \ldots\}$ for carrier 2, up through to the data sequence $\{\ldots, c_{n-1}, c_n, C_{n+1}, \ldots\}$ for carrier N) are replaced by a single block containing the interleaved data bits (represented by the single data sequence $\{\ldots, a_{n-1}, b_{n-1}, \ldots, c_{n-1}, a_n, b_n, \ldots, c_n, a_{n+1}, \ldots, c_{n+1}, \ldots\}$ for all N carriers).

Dynamic Channel Dropping

Another safeguard that can be optionally employed in the system is dynamic carrier dropping. When a network link carrying both primary and diversity carrier data becomes unreliable, the system can automatically drop the diversity carrier. The bandwidth that is freed-up in the link then allows stronger error protection algorithms to be used on the primary carrier. With this increased redundancy, the primary carrier data samples are more reliably transmitted between the base station and remote site. If the quality of the network link improves over time, the diversity carrier can automatically be included again as the error encoding for the primary carrier reverts back to its normal level.

This same concept can be extended to include multiple carriers as well as multiple sectors at a given remote site. For a degraded network link, a multi-carrier system could turn off one or more carriers and use the extra bandwidth for ensuring reliable data transport of the remaining carriers. In a similar manner, one or more sectors at the same remote site can be taken off-line when the communication path becomes unreliable. At this point the site could either leave the sector(s) out-of-service or transmit the same signal from all sectors as long as the communication path remains degraded.

As an example, convolutional codes can be used to add redundancy to the digitized data signals at the expense of increased bandwidth. A rate k/n convolutional code increases the number of data bits by the ratio n/k. For instance, data encoded with a rate 1/2 code would require twice as much bandwidth as it would without any coding. Table 2 gives an example of using 1/2 rate and 2/3 rate convolutional codes for error protection for the SONET example shown in Table 1. As an example, consider the SONET OC-12c link listed in Table 1. With the communications link operating normally (i.e., no excessive bit errors), six carriers are transmitted between the digital hub and the network access node. If a large number of bit errors started to occur, the system could switch to three carriers using a rate 1/2 convolutional code or to four carriers using a rate 2/3 code.

TABLE 2

Example using Convolutional Codes with Dynamic Channel Dropping.

| SONET OC Level | Raw Data Rate (Mbps) | Rate 1/2 Convolutional Code | | Rate 2/3 Convolutional Code | |
| --- | --- | --- | --- | --- | --- |
| | | Number of Carriers | Data Rate per Carrier (Mbps) | Number of Carriers | Data Rate per Carrier (Mbps) |
| OC-12c | 599.040 | 3 | 199.68 | 4 | 149.76 |
| OC-48c | 2396.160 | 12 | 199.68 | 16 | 149.76 |
| OC-192c | 9584.640 | 48 | 199.68 | 64 | 149.76 |

Timing Synchronization

Synchronization between the digital hub and the NAN is achieved by piggybacking on the synchronization provisions already in place in the digital network. All data to be transported over the digital link is broken into frames. The frame size is selected to correspond to the native network frame size.

For example, SONET frames are always 125 μs long, but the number of bits contained in each frame is determined by the OC/STS level. Higher OC/STS levels have more bits-per-frame, corresponding to higher data rates. The first bytes transmitted in each SONET frame are the A1 and A2 framing bytes. These framing bytes always contain pre-set values and are used for timing recovery when receiving and decoding a SONET data stream. By using the native SONET frame structure, the digital hub and NAN are able to get timing information from the SONET framer. Typically, clock recovery at the SONET level will be performed by a circuit that searches for the correct alignment of the A1 & A2 framing bytes. Once the correct byte pattern is found, the circuit sets an output to indicate the frame boundary. This frame boundary output can be used by the digital hub and the NAN for timing purposes.

In one embodiment of the invention, carrier synchronization between the base station hotel and the remote sites is maintained using GPS. In this case, GPS receivers are located at both the digital hub location and the remote sites. A very steady reference signal (such as a 10 MHz tone) is output by the GPS receiver and is used to obtain the correct oscillator frequencies at each site. In cases where GPS is not available or practical, frequency information is sent between the base station hotel and the remote sites in order to synchronize oscillators between the two sites.

Time-of-Arrival

Every NAN has as an option the ability to record time-of-arrival information for uplink received signals. This type of information is valuable for a number of different purposes, most notably for location-based services. As discussed earlier, timing information is recorded at the remote site and transmitted back to the corresponding base station as an auxiliary channel. Timing information can be obtained at the remote site either from GPS or through synchronization with the base stations.

When GPS is used for time-of-arrival information, GPS receivers are required at both the digital hub location and the remote antenna sites. Absolute timing is obtained at each site from the corresponding GPS receiver by means of a 1 pps signal that is used to synchronize a local clock. At the remote site, the local clock is used to provide regular time stamps corresponding to blocks of digitized data that are sent back to the digital hub. The digital hub extracts the timing information from the auxiliary channel and compares it to its own time reference obtained from its local clock. The transmission time delay is then computed as the difference between the digital hub's own time reference and that obtained from the remote site. This time delay is fed to the appropriate measurement unit at the base station site for LBS purposes.

Digital Hub

Overview

The digital hub acts as the interface between the base stations and the digital network. Its main purpose is to convert downlink analog RF signals into a digital format that is compatible with the network, and to extract uplink digital signals from the network and convert them back to analog RF signals. The digital hub digitizes each RF cellular carrier from the base stations separately. For example, a base station operating with three sectors, each with full transmit/receive diversity (without using the diversity time-delay techniques discussed later) requires a digital hub that can simultaneously process six separate RF carriers from the base station.

Figure 12:
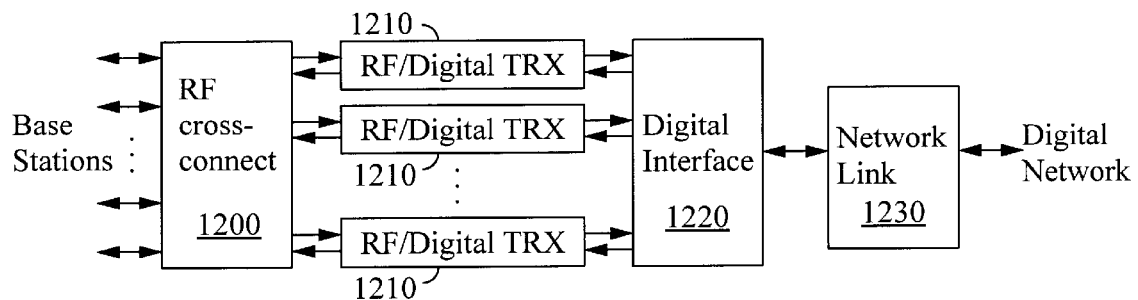
FIG. 12 is a functional block diagram illustrating the main components of a digital hub according to a preferred embodiment of the present invention.

As shown in FIG. 12, a digital hub according to a preferred embodiment is made up of the following elements: an RF Cross-Connect (optional) 1200, RF Digital Transceivers 1210, a Digital Interface 1220, a network link 1230, and possibly network access equipment. In the downlink direction, the digital hub receives each RF channel from the base station via the RF Cross-Connect, and the individual channels are provided to the bank of RF Digital Transceivers. Each channel is then individually digitized after-which error correction bits and auxiliary channel data are added. The resulting data is formatted into an internal protocol, then formatted and framed for transmission over the SDH network, and finally converted to an optical signal. For uplink signals, the reciprocal functions are performed: optical signals are extracted from the network and decoded after-which an error correction algorithm is applied. Cellular data is then broken out from the internal protocol, as is any auxiliary data. Next, the data for each RF channel is individually converted back to analog and up-converted to RF. The bits from the power-control sub-channel are used to scale the uplink signal amplitude accordingly, after-which the final RF signal is sent to the appropriate base station port via the RF cross-connect.

For the case of a SONET/SDH system, the clock source for transmission of the downlink data depends on the network architecture. For a point-to-point configuration, the timing for downlink SDH data transmission is obtained from an on-board clock. When an add/drop multiplexer is used, the transmission timing is derived from the optical network using the add/drop MUX. For uplink data, the clock signal is always obtained from the SDH network.

RF Cross-Connect

The digital hub connects to the base station via an optional RF Cross-Connect module. The purpose of the cross-connect is to allow a single base station to connect to multiple digital hubs. This RF module acts essentially as a splitter for downlink signals and a combiner for uplink signals, thus allowing multiple digital hubs to connect to a single base station.

RF/Digital Transceiver

Each RF/Digital Transceiver (RFDTRx) is responsible for converting a single cellular RF channel between analog RF and digital. Each RFDTRx module supports a single cellular RF carrier in both the uplink and downlink directions.

Figure 13:
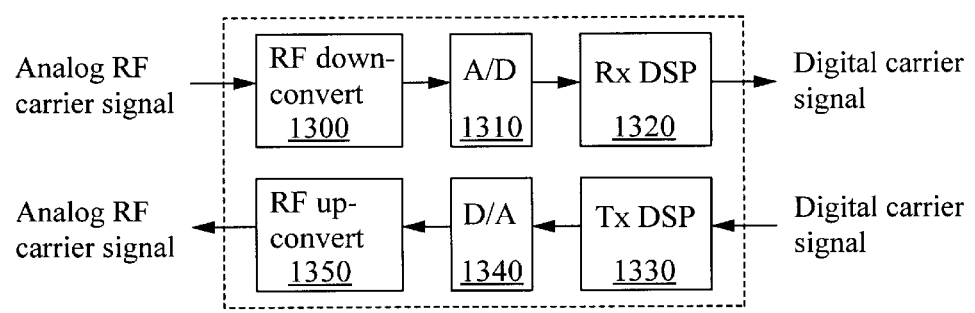
FIG. 13 is a functional block diagram illustrating the main components of an RF/digital transceiver according to a preferred embodiment of the present invention.

A high-level functional block diagram of the RF/Digital Transceiver is shown in FIG. 13. The main components of the RFDTRx are: RF down/up-converters 1300 and 1350, A/D & D/A converters 1310 and 1340, and receive/transmit signal processing elements 1320 and 1330.

In the downlink direction, the analog RF carrier from a base station is fed through the RF Cross-Connect module into the RFDTRx. The signal is then down-converted by down-converter 1300 from RF to IF and digitized using an A/D converter 1310. Finally, digital signal processing block 1320 is used to condition the digitized signal. This conditioning may include down-converting and digitally filtering the signal to attenuate any out-of-band components. The resulting data bits are output to the Digital Interface as a stream of digital samples representing the digitized RF carrier signal. For the uplink path, the RFDTRx receives a constant stream of uplink digital samples representing a single digital RF carrier signal. These samples are digitally processed and up-converted to IF at signal processing block 1330 before running through a D/A converter 1340 which outputs a corresponding analog IF signal. The analog IF signal is then up-converted by up-converter 1350 to RF and sent to the appropriate base station.

Having the RFDTRx operate on a single carrier signal in both the downlink and uplink directions allows the system to be implemented with a scalable architecture. A hardware module such as a plug-in card can be created that performs the functions of a single RFDTRx. As support for additional carriers grows in a system, new hardware modules can be easily added to support the new capability.

Digital Interface

The Digital Interface connects each RF/Digital transceiver unit with a corresponding network link. The Digital Interface is responsible for formatting and framing all downlink digital data into the network protocol and extracting all uplink data from the network protocol.

Each digitized downlink RF carrier signal that is output from the RFDTRx (with corresponding auxiliary channel data) is sent to the Digital Interface. Here, the samples from each digitized carrier are combined with the data from corresponding auxiliary channels. Redundancy bits are also added to the data at this point to allow for detection and correction of errors at the NAN. The resulting data is formatted and framed into the network protocol, then routed to a specific line card (network link).

In the uplink direction, digitized data that is formatted in the network protocol is received by the Digital Interface from a line card. The Digital Interface extracts the digital payload and discriminates the different carriers (including auxiliary channels). Error detection and correction is also performed. The digital data is then routed to an appropriate RF/Digital transceiver.

The Digital Interface is also responsible for rate matching between the RFDTRx and the network link. When network access equipment (such as an add/drop multiplexer for the case of SONET/SDH) is used in conjunction with a digital hub, the transmission timing for the network link is obtained from the optical telecommunications network. Since the RFDTRx clock frequency may be slightly different from the network clock, a rectification is needed. The Digital Interface is responsible for compensating for the clock differences and ensuring that no data is unintentionally lost between each RFDTRx and its corresponding network link.

Network Link

The network link (NL) is assigned the task of converting input digital data to a format compatible with the transport network. In the preferred embodiment, an optical point-to-point link is used, so the NL converts the data to an optical format that is compatible with standard optical telecommunications protocols. Typically, two optical fibers are used to connect the network link to the NAN (one fiber for each direction). If WDM is used, however, then a single fiber can potentially be used to support duplex operation. The main elements of the network link are: a multiplexer, a telecommunications protocol framer and an optical transceiver.

In the downlink path, the formatted data that is output by the Digital Interface is forwarded by the SDH's MUX to the framer. The framer arranges the data into the appropriate format compatible with the particular telecommunications network being used. For example, the NL in a SONET/SDH network would format the data into OC-X/STM-n frames. The formatted data is then passed on to the optical transceiver. After being converted to an optical signal by the transceiver, the data is ready to be output onto the telecom network where it is sent to the appropriate remote site.

Conversely, uplink data that is received from the NAN is first converted from an optical format to an electrical signal. The payload is then extracted from the protocol-specific frames and is multiplexed to the Digital Interface.

Optional Network Access Equipment

Network access equipment may be required to connect the digital hub to the optical network when a dedicated point-to-point configuration is not used. The equipment is used to interface the digital hub to the optical telecommunications network using a standard telecommunications interface. It serves to extract the proper uplink signal from the network and multiplex the outgoing downlink signal onto the network.

For example, a SONET/SDH network may require an add/drop multiplexer to interface the NL to the telecom network. The ADM would extract the appropriate OC-X/STM-n uplink signal from the network and multiplex the downlink signal onto the network via a standard OC-X or STM-n optical interface.

Digital BTS Implementation

Figure 14:
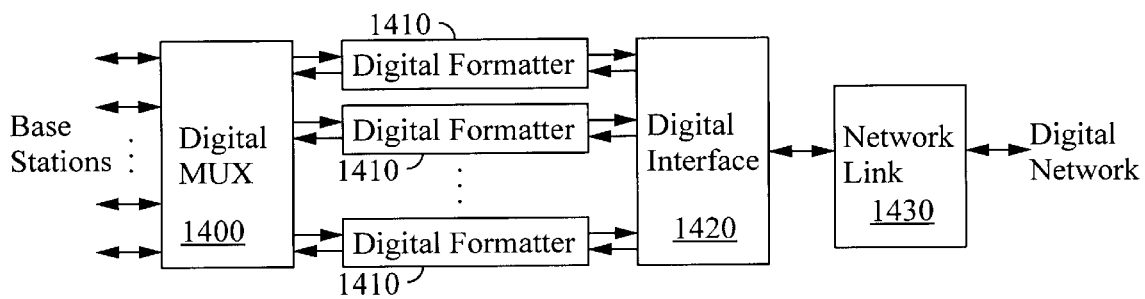
FIG. 14 is a functional block diagram illustrating the main components of a digital hub according to an alternate embodiment of the present invention.

A block diagram of an alternate embodiment of the digital hub is shown in FIG. 14. In this all-digital implementation, the digital hub is able to handle digital data directly from the base station. In this case, the BTS has the capability of outputting downlink carriers and receiving uplink carriers as digital samples rather than as RF signals. For this implementation, the RF Cross-Connect is replaced with a Digital MUX 1400 and each RF/Digital Transceiver is replaced with a Digital Formatter 1410. The Digital MUX 1400 performs the same fundamental functions as the RF Cross-Connect except that it works with digital data rather than with RF signals. It allows downlink and uplink data to be routed between a single base station and multiple digital hubs. The Digital Formatter 1410 serves as an interface between the base station and the Digital Interface on the digital hub. It converts the representation of the digital data between the two units, allowing each of them to process data in their own respective formats. The Digital Interface 1420 and Network Link 1430 are the same as in the embodiment of FIG. 12.

Network Access Node and Antenna Units

Overview

The network access node resides at the remote site. It contains both a network interface unit and a power plant, and serves as the interface to the digital network for one or more antenna units at the remote site. Each antenna unit (also called remote radio unit) typically handles one sector of the cell with multiple RF carriers. If transmit diversity is required, then a separate radio unit is used for each sector with diversity.

In a preferred embodiment, the remote radio units are connected to the NAN through composite fiber cable. This type of connection provides both an optical signal path as well as the required power to the radio units. The radio units then can be easily installed at a location several meters (or several tens of meters) away from the NAN, allowing for a simpler and more cost-effective installation. For example, the NAN could be installed on the main floor of a building where AC power is easy to obtain. The remote radio units could be located on or near the roof of the building (and near the antennas), several stories up. Since power is supplied to the radio units via the composite fiber connection, there would be no requirement for AC power on the roof, where it could be more difficult to obtain.

In the downlink direction, the NAN is responsible for receiving data from the digital hub and sending it to the appropriate remote radio units where it is converted to analog RF and transmitted by the remote site antennas. At the radio units the transmit power level is determined from the data contained in the power control sub-channel. In the uplink direction, the remote radio units receive uplink signals at the antennas and convert these analog RF signals into digital samples that are then sent to the NAN. When the data exchanged between the NAN and the digital hub takes place over the telecommunications network, network access equipment may be required at the NAN for interfacing to the network. The network access node also supports remote OA&M functionality.

For NAN configurations that require additional network interface equipment (such as add/drop multiplexers for SONET/SDH networks), the uplink transmission timing can be derived from the optical network. For point-to-point configurations, however, an on-board clock must be used for timing. In the downlink direction, the clock signal is always obtained from the network.

Network Interface Unit

Overview

The network interface unit at the NAN acts as the main controller for the remote site. It performs multiplexing and conversion between the digital network data format used to communicate with the digital hub and the local high-speed data format that is used to communicate with the remote radio units. When the optical connection is not point-to-point, the network interface unit uses additional telecommunications equipment to multiplex incoming/outgoing signals from/onto the digital network.

Figure 15:
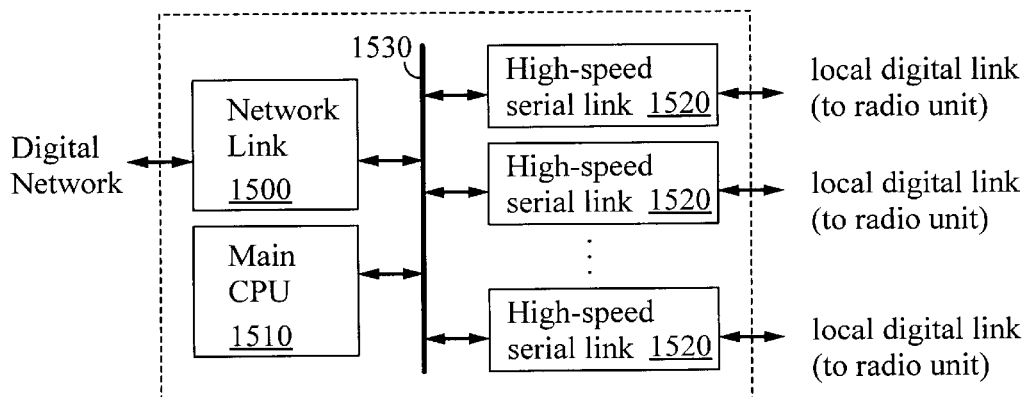
FIG. 15 is a functional block diagram illustrating the main components of a remote site network interface unit according to a preferred embodiment of the present invention.

As shown in FIG. 15, the network interface unit comprises the network link 1500, main CPU 1510, and high-speed serial links 1520 (one for each remote radio unit). Network access equipment (not shown) may also be required to interface to the telecom network. A high-speed bus (telecom bus) is used both for CPU control and for passing data between the network link and high-speed serial sinks.

Network Link

The network link (NL) 1500 is essentially a line card that communicates with the digital hub over the digital network (e.g., fiber optic link). Under the control of the main CPU 1510, it extracts & inserts the internal protocol data to/from the network protocol-dependent frames. Typically, two fibers are required for bi-directional communication between the network link and the digital hub (one for uplink, one for downlink). If WDM is used, however, then a single fiber can transport both uplink and downlink signals for certain types of network architecture.

In the preferred embodiment, the NL 1500 comprises an optical transceiver, a framer and an internal protocol multiplexer. Downlink data is received by the optical transceiver from the telecommunications network, after which the network protocol-specific formatting is removed by the framer. The data is then multiplexed onto the telecom bus where it is sent to the high-speed serial links for transmission to the remote radio units. In the other direction, uplink digital data is received from the high-speed serial links over the telecom bus. This data, which is already formatted with the local link protocol, is further formatted with the framing that is appropriate for the network protocol that is being used, and sent out over the fiber link to the digital hub.

As an example, the NL for a SONET/SDH system would extract downlink data from the telecommunications network. The data would then be processed by removing the OC-X/STM-n framing then formatting the data into the local digital protocol. In the uplink direction, the data received from the high-speed serial ports would be formatted for the SONET/SDH network by framing it at the appropriate OC/STM level before sending it out onto the network.

High-Speed Serial Link

The high-speed serial link 1520 is responsible for the transmission and reception of internal protocol data to and from the remote radio units. Downlink data is received from the network link via the telecom bus 1530. This data is then sent over the appropriate high-speed link to its corresponding remote radio unit. In the uplink direction, each high-speed serial link 1520 receives internal protocol-formatted data from its corresponding remote radio unit. The formatted data is then sent over the telecom bus 1530 to the network link 1500. For cases where telecom interface equipment is used (such as an ADM for a SONET/SDH network), the high-speed serial link also performs rate-matching on the uplink data to match the transmission clock rate in the NL.

Main CPU

The Main CPU 1510 acts as the remote site system controller. It is responsible for the configuration and monitoring of the remote site equipment. It also manages OA&M functions and regularly reports remote site status back to the digital hub.

Remote Radio Unit (Antenna Unit)

Overview

Figure 16:
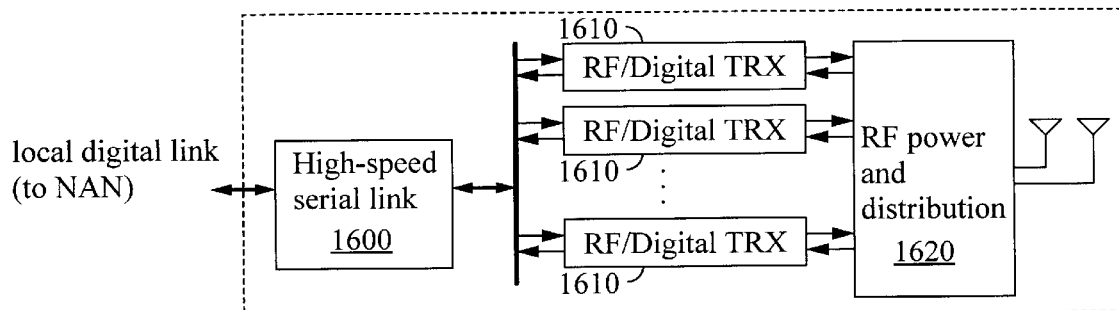
FIG. 16 is a functional block diagram illustrating the main components of a remote site antenna/radio unit according to a preferred embodiment of the present invention.

The remote radio unit is essentially an RF/digital transceiver that sends and receives cellular signals using its antennas. In the preferred embodiment, it is connected to the NAN over composite optical fiber. Digital data in the local protocol format is exchanged bi-directionally between the NAN and the remote radio units over the high-speed serial connection. As shown in FIG. 16, the remote radio unit contains the following functional elements: a high-speed serial link 1600, RF/digital transceivers (RFDTrxs) 1610, and an RF power & distribution module 1620.

Downlink data is received from the NAN, extracted from the internal protocol format, then converted to an analog signal, up-converted in frequency, and finally amplified and transmitted out the antennas. In the uplink direction, signals are received from the mobiles via the antennas, then down-converted, digitized, formatted into the internal protocol, and sent over the high-speed serial connection to the NAN. AC power is supplied to the remote radio unit by the NAN.

High-Speed Serial Link

The high-speed serial link 1600 is responsible for the transmission and reception of local protocol data between the remote radio unit and the NAN. It performs formatting and framing of uplink digital data from the RFDTrx 1610 into local protocol data for transmission to the NAN. Downlink data received over the high-speed serial link is extracted from the local protocol format and sent to the RFDTrx 1610.

RF/Digital Transceiver

The RF/Digital transceiver (RFDTrx) 1610 converts cellular signals between RF and digital format. Like the digital hub's RF/digital transceiver shown in FIG. 13, the RF/digital transceiver at the remote radio unit is comprised of Tx/Rx DSP processing, D/A and A/D converters and RF up/down-converters.

In the downlink direction, the RFDTrx 1610 receives digital data from the high-speed serial link, performs digital signal processing, converts it from digital to analog format, then up-converts it in frequency and passes it to the power amplifier. For uplink signals coming from the antenna, the RFDTrx performs an RF down-conversion on the signal, digitizes it, then performs the required receive signal processing and sends the resulting data to the high-speed serial link. Each RFDTrx 1610 supports a single cellular carrier (both uplink and downlink directions).

RF Power and Distribution

The RF power & distribution element 1620 is the final processing block before transmission of each downlink channel signal. Since each RFDTrx module 1610 supports one RF carrier, sites with multiple carriers may first require RF combining of the downlink carriers before amplification. Signal splitting may also be needed if the same RF signal is to be transmitted from multiple antennas. When multiple downlink carriers are supported, a multiple-channel power amplifier (MCPA) is used for the amplification process. In the uplink direction, signal amplification may be required, as well as distribution to different RF/Digital transceiver units. All this signal combining/splitting and amplification is contained in the RF power and distribution module 1620.

Alternative Implementations

Digital Power Amplifier

Certain power amplifiers (such as some digital pre-distortion PAs) will accept digital data as an input. For this case, an alternative implementation of the RF/digital transceivers at the remote radio unit can be used. In this case, the downlink components of the RF/digital transceiver are replaced by a digital formatter. The digital formatter converts the downlink data from the high-speed serial link into a format that is compatible with the digital PA input. Using this type of implementation eliminates the extra processing steps of D/A conversion and RF up-conversion that are normally performed on downlink data by the RF/digital transceiver.

Diversity Using Time-Delay

Transmit Diversity

Diversity is often used in cellular systems to improve the quality and reliability of wireless communications. Transmit diversity generally requires the base station to generate two similar downlink channels which then get transmitted from separate antennas at the remote site. This type of diversity would normally require increased optical bandwidth to transport the extra digital information from the base station to the remote site.

Figure 17:
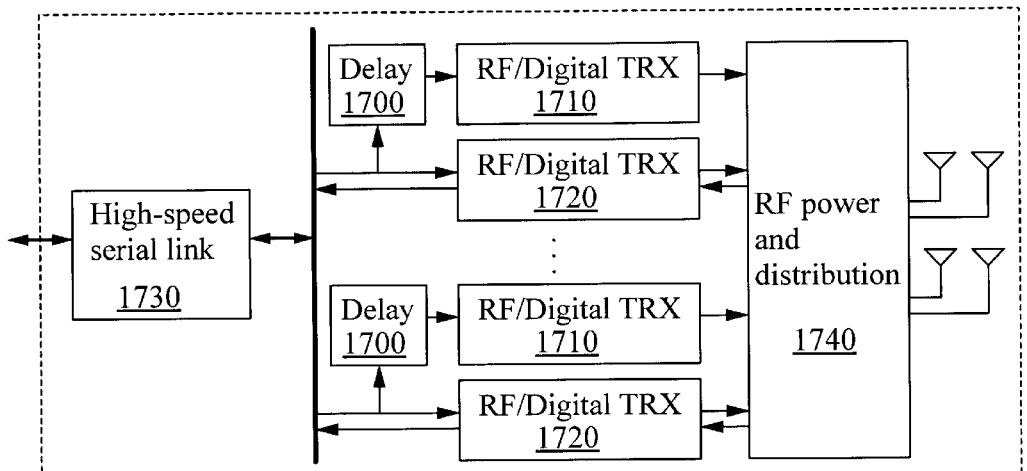
FIG. 17 is a functional block diagram illustrating the main components of a remote site antenna/radio unit having downlink diversity according to an preferred embodiment of the present invention.

According to the preferred embodiment of the invention, a form of transmit diversity can be easily and economically implemented without requiring additional bandwidth or any modification to the base station. As illustrated in FIG. 17, by simply duplicating the downlink signal received at the remote radio unit and time-delaying the duplicate with a delay 1700, a regular signal and diversity signal are generated from the one transported downlink signal. The delayed signal is processed by an RF/Digital TRX 1710 and transmitted from one antenna while simultaneously the original un-delayed signal is processed by an RF/Digital TRX 1720 and transmitted from another antenna. This embodiment includes High-speed serial link 1730 and RF power and distribution module 1740, just as in the embodiment of FIG. 16. Using this technique a combined space-time diversity is obtained. In this embodiment, the duplication and time delay is preferably added at the remote radio unit after the downlink data is processed by the high speed serial link.

By adding diversity in this manner, no more bandwidth is required in the communication links to support an additional signal. The only additional hardware requirement is a delay and an extra RF/digital transceiver for each carrier signal for which diversity is desired. A corresponding power amplifier for the diversity carrier is also needed. If only transmit diversity is used, the additional RF/digital transceiver does not require uplink components.

In an alternate embodiment, the duplication and time-delay can be implemented within the RF/digital transceiver modules. In this case, the duplication and time delay takes place after the digital signal has been converted to analog format but before frequency up-conversion. This implementation has the advantage that the only additional hardware requirement is an analog delay and RF up-converter for each carrier signal for which diversity is desired (plus a corresponding power amplifier).

Receive Diversity

A novel technique can be used to save both processing requirements and communications bandwidth (between the NAN and digital hub) when receive diversity is used in conjunction with base stations that use RAKE receivers. RAKE receivers are the standard receiver type for demodulating CDMA signals, such as those found in 3G cellular systems.

Figure 18:
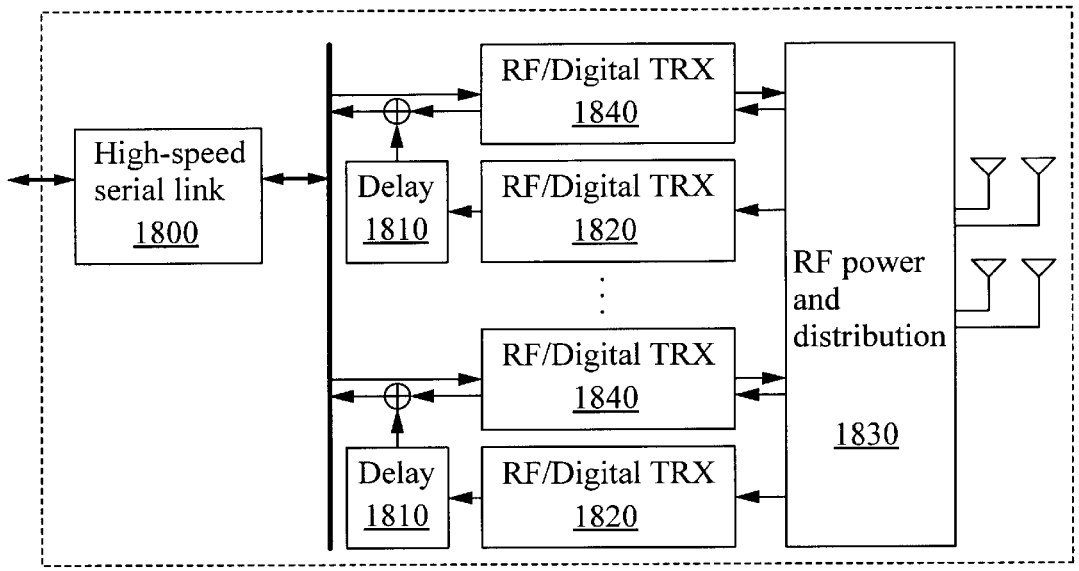
FIG. 18 is a functional block diagram illustrating the main components of a remote site antenna/radio unit having uplink diversity according to a preferred embodiment of the present invention.

For diversity reception, the remote site collects uplink signals using two separate receive antennas: one for the primary signal and the other for the diversity signal. Both antennas output primary and diversity signals that pass through RF power and distribution unit 1830 and are converted to digital format using separate RFDTrx units 1820 and 1840, as shown in FIG. 18. After digital conversion, the diversity channel is delayed in time by delay 1810 and added to the primary channel. Even though the composite signal still contains all the information that both individual signals contained before the summation, only one or two extra bits are required to represent the composite signal digitally.

After the composite digital signal is created, it is treated the same as any other carrier signal as far as the high-speed serial link 1800 and NAN/digital hub processing goes. The signal is transmitted through the optical network to the digital hub where it is converted to an analog RF signal and fed into the base station as if it were a single carrier signal.

During the demodulation process at the base station, the RAKE receiver will automatically extract the two original signals from the composite signal. It will treat the delayed signal as a multipath component, extracting it from the primary signal and capitalizing on the spatial diversity obtained during the reception process. The time delay used in the diversity path must be chosen to be longer than a single chip duration and shorter than the maximum delay spread expected for the system. For 5 MHz bandwidth cellular systems, the chip duration is on the order of 0.2 $\mu$s. A typical time delay value for a macro network could be selected to be in the neighborhood of 1–5 $\mu$s.

Figure 19:
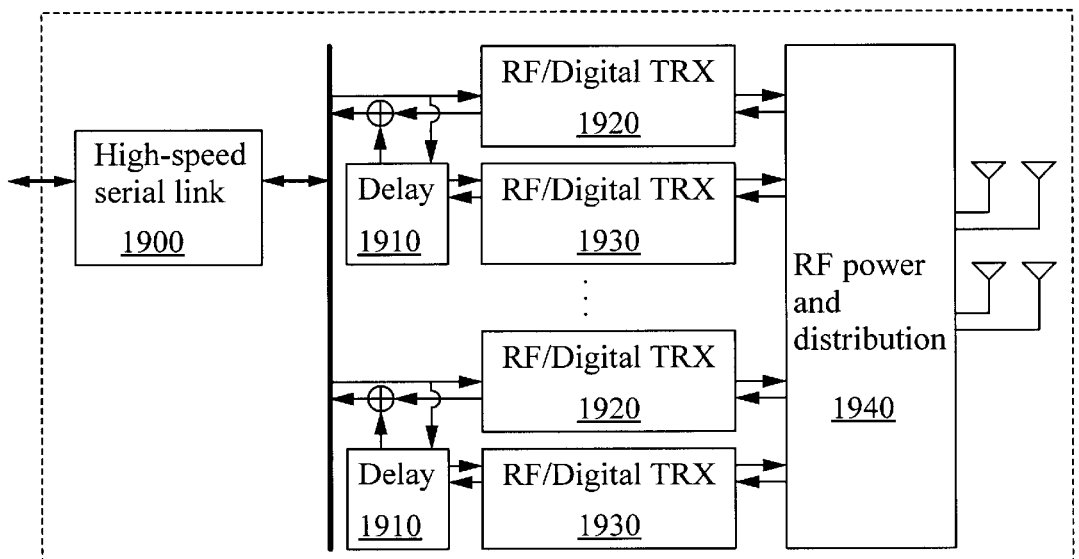
FIG. 19 is a functional block diagram illustrating the main components of a remote site antenna/radio unit having both uplink and downlink diversity according to a preferred embodiment of the present invention.

Those skilled in the art will appreciate that the receive and transmit diversity techniques just described can be advantageously used together, as illustrated in FIG. 19. Transmit and receive diversity signals pass through RF power and distribution module 1940 and are separately processed by RF/Digital TRX units 1920 and 1930. Delay 1910 provides both uplink and downlink delays to one of the signals. The combined signal is communicated to and from the NAN via High-speed serial link 1900.

LAN Implementation of High Speed Serial Links

An alternative implementation the high speed serial links at the remote site uses a local area network (LAN) to handle transmission and reception of all data among remote site components. The LAN design enables construction of the local network from standardized components and allows for a very cost-effective system. A computer could be used as the basic platform for the digital network interface unit with its processor acting as the remote site CPU controller. Rather than using high-speed serial links to pass data between the digital network interface unit and the remote radio units, a network connection running a standard protocol could be used. For example, a high-speed Ethernet or other LAN technology might be used to build a LAN using the host computer and a number of remote radio units.

With this type of architecture, even existing cabling could potentially be used at the NAN site. For instance, a remote site may be deployed on the roof of a tall office building. Potentially, existing LAN cabling in the building could be used to send digitized cellular traffic between the roof location (where the remote radio units/antennas exists) and the location of the host computer.

What is claimed is:

1. A method of wireless communication comprising:

a) at a base station hotel comprising a plurality of base stations, generating at each of the base stations a plurality of downlink analog carrier signals, where each downlink analog carrier signal comprises one or more downlink information signals modulated onto the downlink analog carrier signal;

b) at the base station hotel, individually digitizing each of the plurality of downlink analog carrier signals to produce a corresponding plurality of downlink digital carrier signals, formatting the downlink digital carrier signals according to a digital network protocol, and communicating the formatted downlink digital carrier signals to a remote site via a digital network;

c) at a network access node at the remote site, recovering the downlink digital carrier signals from the formatted downlink digital carrier signals and communicating the recovered downlink digital carrier signals via a local digital link to antenna units at the remote site;

d) at each of the antenna units, converting at least one of the downlink digital carrier signals to a downlink analog intermediate carrier signal, frequency up-converting and amplifying the downlink analog intermediate carrier signal to produce a downlink RF carrier signal and transmitting the downlink RF carrier signal from an antenna to at least one subscriber unit.

2. The method of claim 1 further comprising:

a) at each of the antenna units, receiving a plurality of uplink RF carrier signals at an antenna, frequency down-converting the uplink RF carrier signals to produce uplink analog intermediate carrier signals, individually digitizing the uplink analog intermediate carrier signals to produce a corresponding plurality of uplink digital carrier signals, and communicating the uplink digital carrier signals to the network access node at the remote site via the local digital link;

b) at the network access node, receiving the uplink digital carrier signals from the antenna units, formatting the uplink digital carrier signals according to the digital network protocol, and transmitting the formatted uplink digital carrier signals over the digital network to the base station hotel;

c) at the base station hotel, receiving formatted uplink digital carrier signals from the remote sites, recovering uplink digital carrier signals from the formatted uplink digital carrier signals, converting the recovered uplink digital carrier signals to produce uplink analog carrier signals, and providing the uplink analog carrier signals to base stations in the base station hotel.

3. The method of claim 2 further comprising, at each of the antenna units, time-delaying a diversity uplink digital carrier signal and adding it to the uplink digital carrier signal.

4. The method of claim 2 further comprising: (1) measuring at one of the antenna units a set of power levels corresponding to the plurality of uplink RF carrier signals, (2) transmitting the set of power levels over an auxiliary channel from the remote site to the base station hotel, and (3) using the set of power levels at the base station hotel to individually set power levels of the uplink analog carrier signals provided to the base stations.

5. The method of claim 2 further comprising digitally interleaving the uplink digital carrier signals at the antenna units.

6. The method of claim 1 further comprising, at each of the antenna units, transmitting a time-delayed downlink RF carrier signal from a diversity antenna.

7. The method of claim 1 further comprising: (1) measuring at the base station a set of power levels corresponding to the plurality of downlink analog carrier signals, (2) transmitting the set of power levels over an auxiliary channel from the base station hotel to the remote site, and (3) using the set of power levels at the remote site to individually set transmit power levels when transmitting the corresponding downlink RF carrier signals from the antenna units.

8. The method of claim 1 wherein the plurality of downlink analog carrier signals comprises multiple downlink analog carrier signals corresponding to multiple sectors at a remote site, and wherein the recovered downlink digital carrier signals are communicated to multiple antenna units corresponding to the multiple sectors.

9. The method of claim 1 further comprising digitally interleaving the downlink digital carrier signals at the base station.

10. The method of claim 1 further comprising dropping a diversity channel if a network link becomes unreliable and increasing error protection on a primary channel.

11. The method of claim 1 wherein the local digital link comprises a local area network (LAN).

12. A wireless communication system comprising:
a) a digital network, wherein the network transmits a plurality of downlink digital carrier signals from a base station hotel to a set of remote sites and transmits a plurality of uplink digital carrier signals from the remote sites to the base station hotel;
b) the base station hotel including:
  i) a plurality of base stations; and
  ii) a digital hub comprising:
    1) a plurality of hub RF/digital transceivers connected to the base stations, wherein each of the plurality of downlink digital carrier signals is individually provided by a corresponding one of the plurality of hub RF/digital transceivers responsive to an input obtained from a single-carrier downlink signal; and
    2) a digital interface connecting the hub to the digital network; and
c) the set of remote sites, each site including:
  i) a local digital link;
  ii) a network access node connecting the local digital link to the digital network; and
  iii) a set of antenna units connected to the network access node by the local digital link, each antenna unit comprising:
    1) an antenna;
    2) a plurality of antenna unit RF/digital transceivers, wherein each of the plurality of uplink digital carrier signals is individually provided by a corresponding one of the plurality of antenna unit RF/digital transceivers responsive to an input obtained from a single-carrier uplink signal.

13. The system of claim 12 wherein the local digital link comprises a local area network.

14. The system of claim 12 wherein the local digital link comprises a dedicated fiber optic communication link.

15. The system of claim 12 wherein the local digital link comprises a composite fiber optic cable providing power to the antenna units from a centralized common power supply.

16. The system of claim 12 wherein the separation between the network access node and at least one of the antenna units is 1 m to 100 m.

17. The system of claim 12 wherein the separation between the base station hotel and at least one of the remote sites is 1 km to 10 km.

18. The system of claim 12 wherein at least one antenna unit at the remote site comprises a time delay for generating a transmit diversity downlink signal from a regular downlink signal.

19. The system of claim 12 wherein at least one antenna unit at the remote site comprises a time delay for generating a delayed receive diversity uplink signal from a receive diversity signal.

* * * * *